United States Patent [19]

Watts

[11] 4,151,870

[45] May 1, 1979

[54] WHEEL WITH IMPROVED TIRE BEAD RETAINER

[75] Inventor: George T. Watts, North Canton, Ohio

[73] Assignee: The Goodyear Tire & Rubber Company, Akron, Ohio

[21] Appl. No.: 775,445

[22] Filed: Mar. 8, 1977

[51] Int. Cl.² ............................................. B60C 25/00
[52] U.S. Cl. ................................ 152/375; 152/379.1; 152/399
[58] Field of Search ................................. 152/375–384, 152/386–392, 404, 405, 408, 399, 400; 301/97

[56] References Cited

U.S. PATENT DOCUMENTS

| | | | |
|---|---|---|---|
| 2,840,133 | 6/1958 | Billingsley | 152/396 |
| 3,664,405 | 6/1970 | Poyner | 152/375 |
| 3,882,919 | 5/1975 | Sons, Jr. et al. | 152/410 |
| 3,995,676 | 12/1976 | Casey | 152/410 |
| 4,042,003 | 8/1977 | Gaskill | 152/381.2 |

FOREIGN PATENT DOCUMENTS 1410914 10/1975 United Kingdom ................. 152/378

Primary Examiner—Francis S. Husar
Assistant Examiner—D. W. Underwood
Attorney, Agent, or Firm—Barnes, Kisselle, Raisch & Choate

[57] ABSTRACT

A wheel with a rim having a drop center well and a retainer member for a tubeless pneumatic tire. In use the bead of the inflated tire is prevented from moving inwardly off the bear seat and into the drop center well of the rim by the retainer member which is fixed to the rim axially inwardly of and adjacent a bead of the tire. If during mounting and inflation of the tire a bead thereof becomes caught on the retainer, a gas bleed passage through the retainer prevents the tire from being inflated while the bead is caught thereon, thereby preventing damage to the bead of the tire and minimizing the risk of personal injury.

10 Claims, 8 Drawing Figures

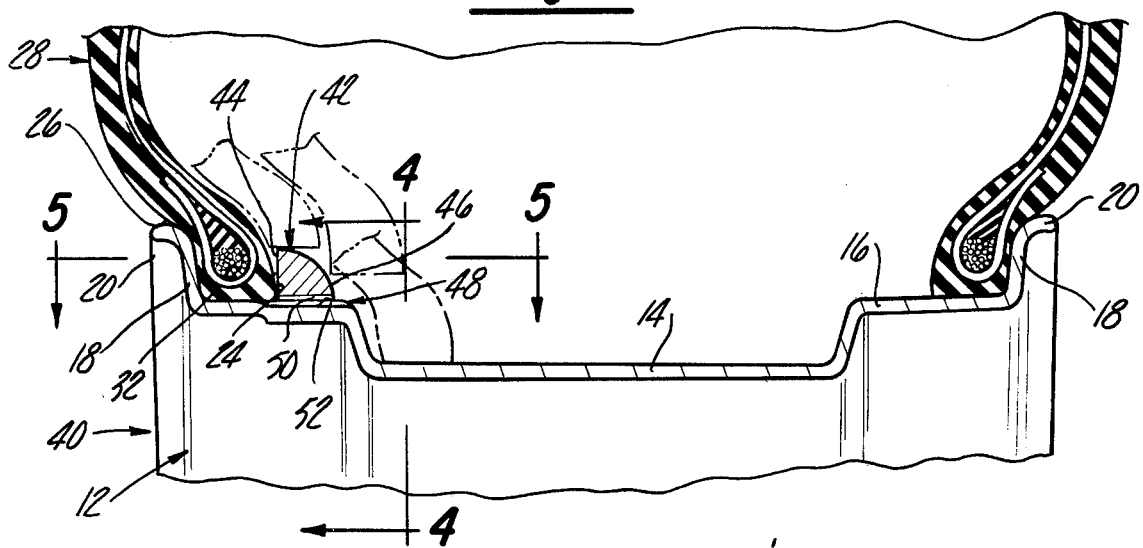
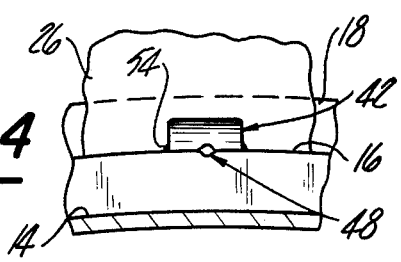
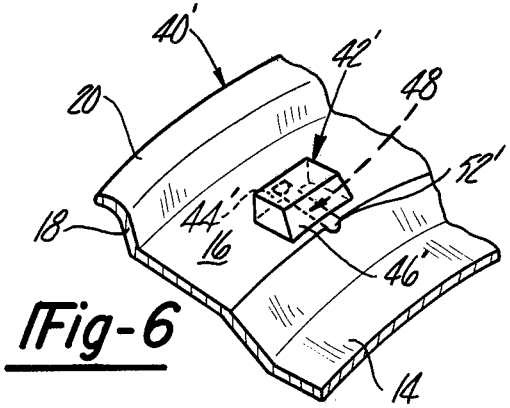
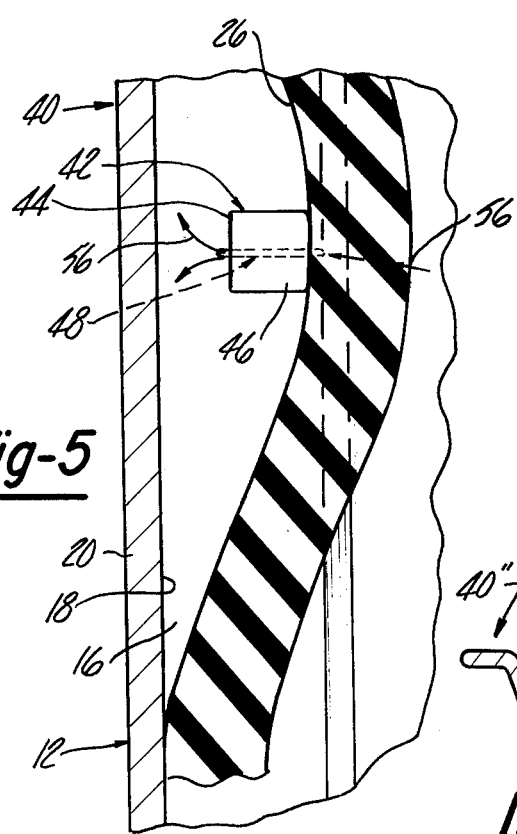
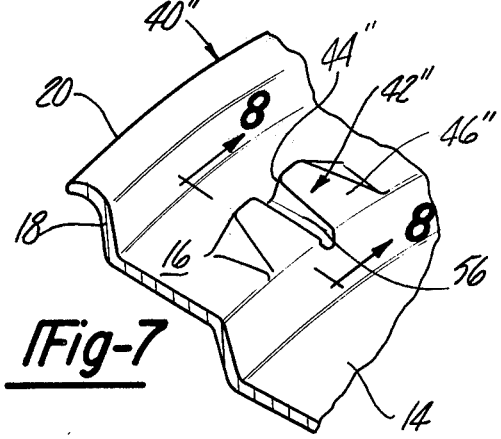

WHEEL WITH IMPROVED TIRE BEAD RETAINER

This invention relates to a wheel having a rim with a drop center well for a pneumatic tubeless tire and more particularly to such a wheel with a tire bead retainer.

When in use on motor vehicles, the bead of an inflated pneumatic tubeless tire may occasionally move axially inward from the rim flange of the wheel and slide off the bead seat and into the wheel well. Such movement may be either the cause or result of tire deflation, and occasionally it may cause the tire to separate from and come completely off of the wheel upon which it was mounted.

To retain the beads of tires upon a wheel rim it has been previously proposed to fix a retainer member to the bead seat of the rim so that the retainer member projects radially outwardly of the bead seat and lies inward of and adjacent to the bead of the tire when it is received on the bead seat of the rim in engagement with an associated retaining flange of the rim. One such wheel construction is disclosed in Poyner U.S. Pat. No. 3,664,405 issued May 23, 1972, as having retainer members in the form of two localized projections one of which is associated with and fixed to each bead seat with the two projections being axially spaced apart and diametrically opposed to each other with respect to the wheel.

The beads of tubeless tires are essentially inextensible, and hence, it has been found that when mounting a tubeless tire on a wheel rim with two diametrically opposed and axially spaced apart localized projections, a portion of a bead of the tire becomes caught or hung-up on one of the projections unless such portion of the bead is manually lifted over the projection by placing a diametrically opposed portion of the bead in the wheel well to provide adequate clearance to permit such portion of the bead seat to be lifted over the projection. Tire mounting machines normally position tires and wheel rims in a horizontal plane, and hence, if each bead is not manually lifted over its associated projection, it is quite possible that it will not be noticed or detected that a bead is caught or hung-up on the projection until after the tire and wheel have been inflated and removed from the tire mounting machine or that the inflated tire and wheel will be mounted on a vehicle without detecting that the bead is caught or hung-up on the projection.

If it is attempted to inflate the tire with one of its beads in the caught or hung-up position, such a bead would be weakened and its strands of wire stressed, stretched and/or kinked to such an extent that it is permanently deformed. Thus, the tire may be damaged either to such an extent that it cannot be mounted on the wheel and used in service or even if it can still be mounted on the wheel, it may prematurely fail when in service. Furthermore, when the tire is inflated to its recommended bead seating pressure which is substantially greater than the normal tire operating pressure, the wire strands of the bead may break, the bead may snap or jump over the flange of the rim, and/or the wheel may suddenly move upwardly thereby creating a risk of injury to any persons standing nearby.

Objects of this invention are to provide a retainer member for a wheel which is constructed and arranged to minimize the risk of personal injury and prevent the bead of a tire from being damaged during mounting of the tire on a wheel if the bead becomes caught on the retainer and it is attempted to inflate the tire, prevents the tire from remaining fully inflated at its normal operating pressure if a bead of the tire is caught on the retainer, and is of simple design and construction, and of economical manufacture.

These and other objects, features, and advantages of this invention will be apparent from the following detailed description, appended claims, and accompanying drawings in which:

FIG. 3 is a fragmentary cross sectional view of a tubeless pneumatic tire received on the drop center rim of a wheel embodying the present invention.

FIG. 4 is a fragmentary sectional view on line 4—4 of FIG. 3.

FIG. 5 is a fragmentary semi-diagrammatic view of a bead of a tire caught on the retainer member of the wheel of FIG. 3 and illustrates the position the bead of the tire assumes when it is attempted to inflate the tire.

FIG. 6 is a fragmentary view of a drop center rim of a wheel with a modified form of the retainer member of this invention.

FIG. 7 is a fragmentary view of a drop center rim of a wheel with another modified form of the retainer member of this invention.

FIG. 8 is a fragmentary sectional view on line 8—8 of FIG. 7.

Figure 1:
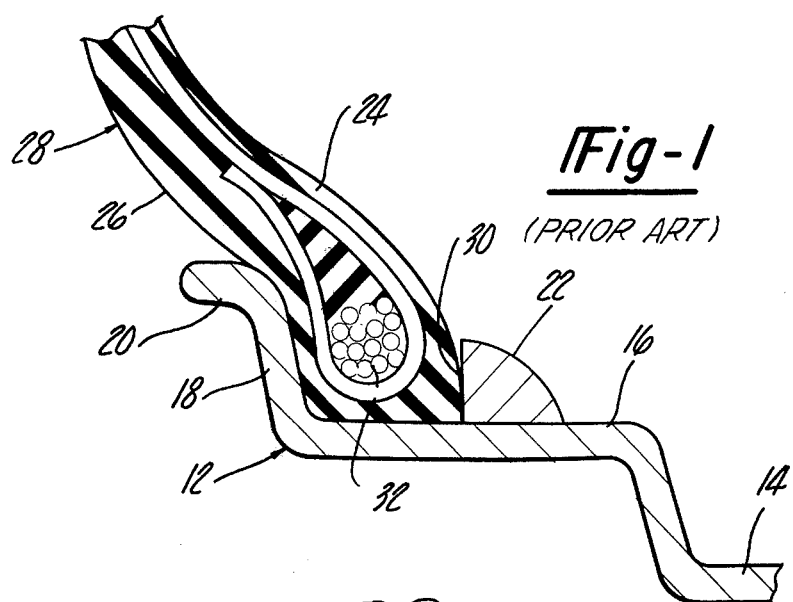
FIG. 1 is a fragmentary cross sectional view of a bead of a tubeless pneumatic tire received on the bead seat of a drop center rim of a wheel having a prior art retainer member.
Figure 2:
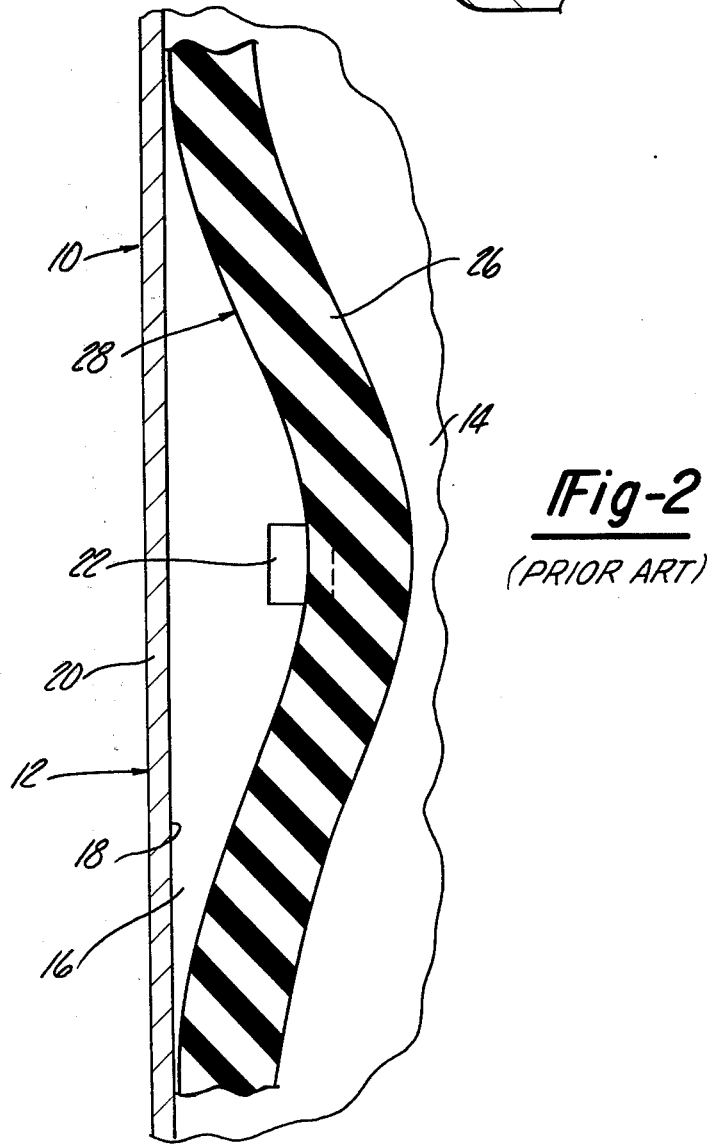
FIG. 2 is a fragmentary semi-diagrammatic view of the bead of a tire caught on the retainer of the wheel of FIG. 1 with the bead illustrated in the position it assumes when the tire is partially inflated.

Referring in more detail to the drawings, FIGS. 1 and 2 illustrate a prior art wheel 10 with a circumferentially continuous one-piece rim 12 having a drop center well 14 and a pair of integral axially spaced apart bead seats 16 (only one of which is shown) each having a generally radially outwardly projecting retainer flange 18 terminating in a reinforcing lip 20. Preferably each bead seat 16 has only one retainer member 22 which is fixed on the bead seat adjacent the inner face of the toe 24 of the bead 26 of a pneumatic tubeless tire 28 received on the rim 12. The two retainer members 22 are axially spaced apart and located on their respective bead seats 16 in diametrically opposed relation to each other. Each retainer member 22 is a solid one-piece body with an abutment face 30 adjacent bead 26 which projects generally radially outward of bead seat 16 and extends generally circumferentially along the bead seat for a relatively small portion of the circumference of the bead seat. This prior art wheel and retainer member construction is described in the aforementioned Poyner U.S. Pat. No. 3,644,405 which is incorporated herein by reference and hence, need not be further described.

As shown in FIG. 2, when a pneumatic tubeless tire 28 becomes caught on retainer member 22 during mounting of the tire on a wheel 10 and is partially inflated, the bead 26 of the tire including the usual strands of wire 32 thereof may be flexed and bowed around the retainer member because the bead 26 may have a substantially air tight seating with the rim seat 16 despite being warped around retainer 22. This flexing and bowing of the bead 26 including wire 32 may stress the bead and thereby damage the tire. Inflation of the tire when thus hung-up may permanently deform the strands of wire 32 thereby weakening the bead 26 and damaging the tire to such an extent that it should not be used in service. To seat the beads 26 on the rim, the tire is usually further inflated to a pressure substantially in excess of its normal operating pressure and often in excess of 40 PSIG which is a commonly recommended bead seating pressure for passenger vehicle tires. This excess pressure may break the strands of wire 32 of a bead hung-up on a projection and even cause the bead to jump over the rim flange 18 possibly injuring any person who may be standing nearby. If an inflated tire with a bead in the hung-up position is mounted on a vehicle, the damage caused by inflation and/or stresses created by use of the tire on the vehicle may cause the tire to prematurely fail while in use.

FIGS. 3 and 4 illustrate a wheel 40 embodying this invention with a tubeless pneumatic tire 28 mounted thereon and having beads 26 with bead wires 32 therein. Wheel 40 has a rim 12 with a drop center well 14, bead seats 16, and retainer flanges 18 each terminating in a reinforcing lip 20. Rim 12 of wheel 40 has at least one retainer member 42 fixed on at least one bead seat 16 and preferably one retainer 42 fixed on each bead seat 16 in axially spaced apart and diametrically opposed relation to each other.

Each retainer member 42 has an abutment face 44 which lies immediately adjacent the inner face of the toe 24 of bead 26 when the bead is received on the bead seat 16 of rim 12 in engagement with retainer flange 18. An inclined inner face 46 on each retainer member 42 provides a ramp which if engaged by a bead, facilitates manually moving the bead over retainer member 42 and into engagement with flange 18. Faces 44 and 46 on retainer member 42 each extend generally radially outwardly of their associated bead seat 16 preferably about one-quarter of an inch but no farther than flange 18. Each retainer member 42 extends generally circumferentially of its associated bead seat not more than twenty percent (20%) of the circumference of its associated bead seat.

In accordance with a principal feature of this invention, each retainer member 42 has an air bleed passage 48 extending thereacross generally axially of wheel 12 and communicating at one end with the drop center well 14 of rim 12 and opening at the other end into the area between the abutment face 44 of retainer member 42 and the adjacent rim flange 18. The inboard end of passage 48 is disposed at least partially radially inwardly of the main bead seating surface of seat 16 so as to be exposed to the well area (and interior of tire 28) below the inner periphery of toe 24 when the same becomes hung-up on retainer 42. Preferably, as shown in FIG. 3, the outboard end of passage 48 is located so that it is sealed or closed off, to prevent gas from escaping therethrough, by a tire bead 26 properly seated on its associated bead seat 16 of rim 12.

Passage 48 is defined by a semi-circular groove 50 extending across the lower face of retainer 42 and a complimentary semi-circular groove 52 in bead seat 16 which underlies and is juxtaposed to groove 50. If desired in manufacturing wheel 40, retainer 42 can be located on bead seat 16 for being fixed thereto with grooves 50 and 52 properly aligned, by inserting a locator pin of the appropriate diameter in groove 52 and registering retainer 42 by seating its groove 50 on the pin. After permanently fixing retainer 42 to bead seat 16, such as by welds 54, the locator pin is removed from passage 48.

As shown in FIG. 5, when a bead 26 of a pneumatic tubeless tire 28 becomes caught on a retainer 42 during mounting of the tire on wheel 40, the tire cannot be inflated sufficiently to damage the bead because the gas used to inflate the tire will escape to the exterior thereof through passage 48 as indicated by the arrows 56. Thus, during attempted inflation of the tire, bleed passage 48 limits the inflation pressure to a value which prevents the tire bead from being unduly stressed about its associated retainer 42, thereby minimizing the risk of personal injury and preventing the tire bead from being damaged. Preferably bleed passage 48 is made large enough to prevent a tire with a bead caught on a retainer from being inflated to a pressure greater than its recommended normal operating pressure.

FIG. 6 illustrates a wheel 40' having a modified retainer member 42' which is the same as retainer member 42 except that it is generally rectangular and does not have groove 50 therein forming a part of passage 48. Rather passage 48 is formed solely in bead seat 16 by a groove 52' of semi-circular cross-section which underlies and extends generally axially of rim 12 across and beyond both the abutment and inclined faces 44' and 46' of retainer member 42'.

Similarly, FIGS. 7 and 8 illustrate a wheel 40" having another form of modified retainer 42" formed as a homogeneously integral protuberance in the associated bead seat 16 with abutment and inclined faces 44" and 46". A bleed passage 48 is provided in retainer member 42" by a generally semi-circular groove 58 extending thereacross and opening radially outwardly thereof. Retainer 42" and the groove 58 thereof may be formed as a homogeneously integral portion of a one-piece wheel rim 40" by suitable die stamping operations.

In practice, a wheel having two axially spaced apart and diametrically opposed retainers 42, 42' or 42", one of which is fixed to each bead seat of the wheel and each having a passage 48 with a diameter in the range of 0.18 to 0.38 of an inch, is believed to be satisfactory for conventional passenger vehicle tubeless pneumatic tires ranging in size from A-13 to L-15 as defined in the 1976 Yearbook of the Tire and Rim Association. Attempts to inflate such a tubeless tire with air at a pressure of about 100 pounds per square inch gauge (PSIG) do not produce any detectable damage to the bead of the tire or its strands of wire even when caught on a retainer. Moreover, even when being supplied with air at a pressure of 150 PSIG, which is believed to be the maximum air pressure utilized by garages, gas stations, etc., to inflate tires for passenger vehicles, such a tubeless tire cannot be inflated to more than 25 PSIG so long as a bead of the tire is caught on a retainer of this invention having a bleed passage 48 with a minimum diameter of at least 0.28 of an inch.

While certain representative embodiments and details have been shown for the purpose of illustrating the invention, it will be apparent to those skilled in this art that various changes and modifications may be made therein without departing from the spirit or scope of the invention.

I claim:
1. In a wheel for a pneumatic tubeless tire having a rim with a drop well, a flange secured to the rim, a tire bead seat on said rim adjacent said flange and a tire bead safety retainer comprising permanent non-yieldable solid means projecting radially from said bead seat and circumferentially therealong for a relatively small portion of the circumference of the bead seat, said retainer being fixed to said rim and having a tire bead abutment face extending generally radially outwardly and circumferentially of said bead seat on the side of said retainer facing said rim flange and constructed and arranged to overlap and lie closely adjacent a portion of the inner face of a tire bead received on said bead seat in the space between said flange and said bead retainer, said retainer having a ramp face disposed remote from said abutment face on the well side of said retainer, said rim having a surface portion immediately adjacent and inwardly of said retainer ramp face capable of air tight seating engagement with the bead of the tire when the same becomes hung up on said ramp face, the improvement comprising means including said bead retainer providing an axially extending gas bleed passage having an inlet located radially inwardly of said rim surface portion adjacent said drop well and between said well and said rim surface portion, said passage extending from said inlet at least in part radially inwardly of said rim surface portion to an outlet of said passage communicating with the outside atmosphere in said space between said bead retainer and said flange, said passage providing a controlled leakage to outside atmosphere via said passage outlet for gas admitted to the interior of a tire mounted on said rim when the tire bead is hung up on said ramp face and in air tight seating with said rim surface portion such that inflation of the tire is prevented, said passage outlet being disposed such that a tire bead properly seated between said retainer and rim flange blocks said passage outlet and permits inflation of the tire.

2. The improvement of claim 1 wherein said gas bleed passage has a minimum diameter in the range of 0.1 to 0.2 of an inch when the tire bead is in said hung up condition on one of said retainer ramp faces.

3. The improvement of claim 1 wherein said retainer comprises a protuberance homogeneously integral with the rim and said gas bleed passage comprises a groove in and extending generally axially across said protuberance and opening generally radially outwardly thereof.

4. The improvement of claim 3 wherein the wheel has only two of said retainers one of which is associated with each bead seat and said two retainers are axially spaced apart and diametrically opposed to each other with respect to the rim of the wheel.

5. The improvement of claim 1 wherein said retainer comprises a body separate from and fixed to the rim and said gas bleed passage comprises a pair of complimentary grooves one of which is in said body and the other of which is in the rim.

6. The improvement set forth in claim 1 wherein said bead abutment face extends circumferentially of said bead seat for only about 20% or less of the total circumference of said bead seat.

7. The improvement set forth in claim 1 wherein said bead abutment face radially projects on the order of one-quarter inch from said bead seat.

8. The improvement set forth in claim 1 wherein said wheel comprises two flanges axially spaced apart and secured to said rim, a said bead seat associated with each said flange, a said bead retainer associated with each said bead seat, and means including said bead retainers providing a said gas bleed passage associated with each said bead retainer.

9. The improvement of claim 8 wherein the wheel has only two of said retainers one of which is associated with each bead seat and said two retainers are axially spaced apart and diametrically opposed to each other with respect to the rim of the wheel.

10. The improvement of claim 8 wherein each retainer comprises a body separate from and fixed to the rim and said gas bleed passage comprises a groove wholly within the rim and underlying and extending generally axially across said body of said retainer.

* * * * *